May 2, 1933.  A. W. ANDERSON ET AL  1,907,413
COMBINATION KITCHEN MACHINE
Filed Oct. 16, 1931   2 Sheets-Sheet 1
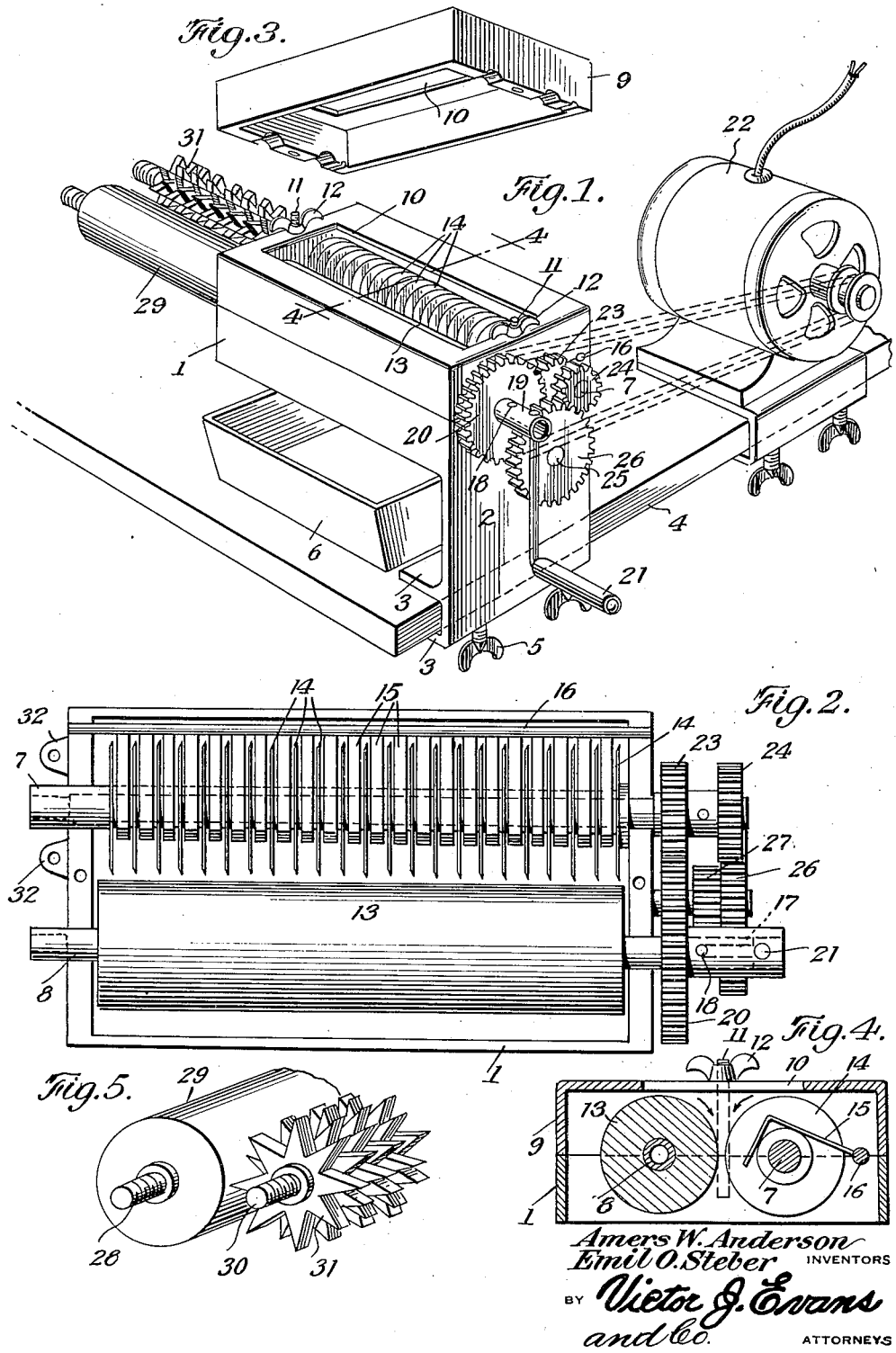

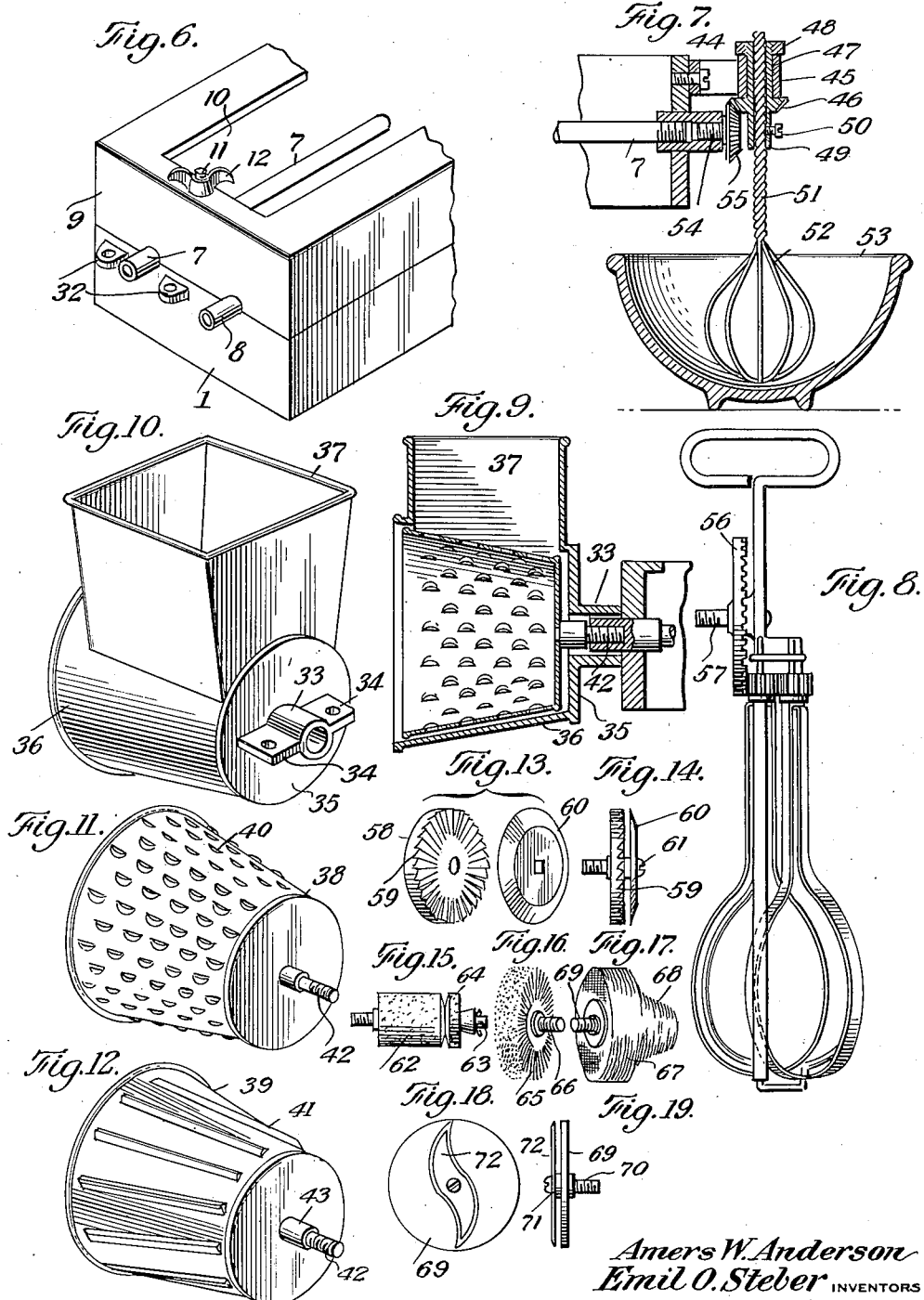

Patented May 2, 1933

1,907,413

UNITED STATES PATENT OFFICE

AMERS W. ANDERSON AND EMIL O. STEBER, OF SPOKANE, WASHINGTON

COMBINATION KITCHEN MACHINE

Application filed October 16, 1931. Serial No. 569,303.

Our present invention has reference to what we will term a combination kitchen machine, inasmuch as the same provides removably associated and interchangeable means for performing many functions which heretofore have been accomplished only by separate and distinct machines or apparatus.

The object of the invention is the provision of a simple but efficient and inexpensive machine which may be employed for pre-preparing and improving meats or other foodstuffs such as by perforating the same, cutting such foodstuffs into cubes, cutting the same into strips, and slicing and grating materials, beating eggs, whipping, etc., as well as providing means for grinding or sharpening the cooking knives and like implements, in scouring or polishing utensils, opening cans, and for performing other useful or necessary kitchen duties.

A further object of the invention is to provide a machine of the character stated, especially adapted to be used domestically for tendering steak by passing the steak one or more times between a rotating feed roller and a series of rotating disks spaced from the feed roller and having means for causing the roller and the series of disks to rotate at different rates of speed and whereby slits are cut in the steak, said slits extending almost through the thickness of the steak and dividing the steak into numerous attached cubes. The term cubes, as used to describe the tendering of the steak, does not literally mean that the steak is cut into separated pieces, but is intended to mean that the steak is subjected to crisscross slitting which reduces the steak substantially to a film having cube-like areas at its surface.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a perspective view of the machine attached to a table or like support.

Figure 2 is a plan view with the top or lid removed.

Figure 3 is a perspective view looking toward the under face of the top or lid.

Figure 4 is a section on the line 4—4 of Fig. 1.

Figure 5 is a detail perspective view of the interchangeable steak perforator and the roller which cooperates therewith.

Figure 6 is a fragmentary perspective view looking toward the rear end of the frame.

Figure 7 is a side elevation, partly in section of an egg-beater or mixer operated by the machine.

Figure 8 is a side elevation of an ordinary egg beater or mixer which may be operated by the machine.

Figure 9 is a detail sectional view showing a shredder attached for operation by the machine.

Figure 10 is a perspective view of the hopper and housing for the shredder and slicer.

Figure 11 is a perspective view of the shredder.

Figure 12 is a similar view of the slicer.

Figure 13 is a perspective view of the can opener, the parts being separated.

Figure 14 is an edge view thereof with the parts associated.

Figure 15 is a plan view of a knife and scissors grinder which is operated by the machine.

Figure 16 is a perspective view of a scratch or scraping brush which is operated by the machine.

Figure 17 is a similar view of a polishing head or buffer to be operated by the machine.

Figure 18 is a plan view of a double edged cutter, also operated by the machine.

Figure 19 is an edge view thereof.

The frame or body 1 is of rectangular or box-shaped formation and has a depending end 2 formed with parallel laterally extending spaced flanges 3, that receive therebetween the top 4 of a table, the lower flange 3 having screwed therethrough wing bolts 5 for supporting the improvement on the table. The depending side 2 affords a space below the open bottom of the body for a dish 6 which can be easily slipped under the front side or rear without interferring with any of the working parts of the machine. The top of the body 1 has its ends provided each with a pair of spaced substantially semi-cylindrical depressions that afford lower bearings for shafts 7 and 8, respectively. The upper bearings for the shafts are provided by similar depressions upon the lower edges of the ends of a removable top or cap 9 which is of a size corresponding to that of the body 1, the said cap or top having its outer face provided with a central substantially rectangular opening 10. Bolts 11 arise from the center of the ends of the body and pass through openings in the ends of the cap 9 and these bolts are engaged by wing nuts 12. The shaft 8 has keyed or otherwise fixed thereon a feed roller 13 and the shaft 7 has fixed thereon hubs of a plurality of equidistantly spaced cutter discs 14. The roller and discs are arranged in the body of the improvement and there is disposed between the cutter discs 14 combined guard and cleaner members in the nature of angle plates 15, all of which are pivotally mounted upon a rod or shaft 16 that is journaled in suitable bearing openings at the confronting ends of the body in the top or cap therefor.

Both the shafts 7 and 8 are preferably hollow and the end of the shaft 8 which projects beyond the end 2 of the body is slotted longitudinally, as at 17 (dotted line Figure 2). The slot receives therethrough a pin 18 on the outwardly extending tubular hub 19 for a main drive gear 20. The hollow hub 19 has removably fixed on its outer end a crank handle 21, but the hub may also carry a pulley wheel for a belt that may be driven by an electric motor 22 whose base is clamped on the table 4, as disclosed by Figure 1 of the drawings.

On the end of the shaft 7 which projects beyond the end 2 of the body there is removably fixed two spaced pinions 23 and 24, respectively, and the pinion 23 is normally in mesh with a gear wheel 20, and the said gear 20 is large in comparison with the size of the pinions. The cutter discs 14 and roller 13 turn toward each other in the direction of the arrows in Figure 4 when the shafts 7 and 8 are rotated so that material fed between these elements will be properly cut by the cutter discs 14 and directed downwardly by the roller 13 while the spaces between the discs 14 are retained in a clean condition by the elements 15.

It may be found desirable to rotate the shaft 7 at a greater rate of speed than the roller carrying shaft 3 and, therefore, I removably fix on the end 2 of the body, below the said shafts, a stub shaft 25 on which is keyed a gear 26 that carries on its inner face a pinion 27. By shifting or imparting a longitudinal movement to the hub 19 the drive gear 20 is brought to mesh with the pinion 27 and the gear 26 is in mesh with the pinion 24 so that the turning of the shaft or the operation of the motor will thus impart higher speed to the shaft 7 than to the shaft 8.

The ends of the shafts 7 and 8 which project beyond the second and what may be termed rear end of the body or frame are provided with sockets that have opposite hand pitched threads and there may be screwed in the socket on the shaft 8 a threaded short shaft 28 fixed on a roller 29 and likewise threaded in the socket on the end of the shaft 7 a short shaft 30 for staggeredly related but contacting spur wheels 31. This provides a meat tendering device for the machine. A steak or like piece of meat is fed between the roller 29 and the spur wheels 31 when the shafts 7 and 8 are rotated. The teeth of the spur wheels do not penetrate the meat but indents the same, as the spur wheels are slightly spaced away from the roller 29. This leaves a thin film of uncut meat. When the meat is first passed between the roller and spur wheels it may be caught by the hand of the operator beneath the said roller and spur wheels and turned reversely after being passed between the revoluble rollers and the spur wheels. The result is that the meat is rendered more tender than can be accomplished by pounding, indenting or perforating the same, the meat thus being cut into small cubes or dices so that the fibre of the meat is severed in the tendering operation.

We have referred to the shafts 28 and 30 as stub shafts, but preferably these shafts extend through the roller and the hubs of the spur wheels and are fixed thereto and have their outer ends provided with interiorly threaded sockets in which may be screwed other shafts carrying other devices for kitchen uses.

The rear end of the body 1, to the opposite sides of the projecting end of the shaft 7, is formed with outstanding ears 32 and the projecting end of the said shaft 7 may receive therethrough a hollow hub 33 having flat lateral extensions 34 which rest on the ears and are removably secured thereto by bolts or analogous devices. The hub member is formed upon the reduced rounded end 35 of a tapered housing 36 that is provided, at its top, with a hopper 37. In the housing there may be arranged a substantially cone-shaped shredder 38 or a substantially cone-shaped slicer 39. The members 38 and 39 are hollow and the shredder 38 is peripherally formed with alternate series of outwardly rounded or bulged portions which afford cutters 40, while the perimeter of the slicer 39 is slitted longitudinally and transversely and the metal bounded by the slits is bent outwardly to afford blades 41. The inner end of each of the members 38 and 39 is closed and has centrally passed therethrough a bolt member 42. The bolt member has arranged thereon or the reduced ends of the members 38 and 39 are formed with sleeves 43 and the bolt member is designed, as disclosed by Figure 9 of the drawings, to be screwed in the socket end of the shaft 7. The housing 36 and the hopper are held from movement but either of the elements 38 and 39 will be rapidly rotated by the turning of the shaft 7 so that materials to be sliced or shredded, when passed through the hopper 37 will be operated on by either the rapidly rotating member 38 or 39 and the shredded or sliced material will be delivered through the widened and opened outer end of the housing 36 into a receptacle provided therefor and which may rest on the table 4. The cap or top of the body may have bolted thereto a removable bracket 44 provided with a bearing 45 for the hub of a beveled pinion 46. The hub is indicated by the numeral 47 and has screwed thereon a nut 48 which contacts with the top of the bearing 45, while a tubular member or sleeve 49 extends from the pinion 46 and has threaded therethrough a short bolt 50 to engage with the stem 51 of a beater or whipper 52. The beater or whipper is arranged in a suitable bowl 53 supported on the table 4 and there is screwed in the socket of one of the shafts the threaded short stem or shaft 54 of a beveled pinion 55 which is in mesh with the pinion 46. In this manner it will be noted that the beater or whipper may be rapidly revolved so that materials placed in the bowl 53 will be rapidly whipped or beaten to a desired consistency.

Figure 8 discloses an ordinary egg beater construction in which the operating toothed wheel 56 which engages the intermeshing pinions of the beater arms is provided with a stub shaft 57 that is threaded and is designed to be screwed in the socket of one of the shafts 7 or 8. Thus it will be seen that with the improvement an ordinary whipper or beater may be employed and the same will be operated in a more rapid and more effective manner than were the same hand operated.

In Figures 13 and 14 a cutter or opener for cans or the like is disclosed. This device comprises a disc 58 that has its outer face provided with radially arranged teeth 50 and a cutting disc 60. The can or the like is to be arranged between the toothed disc and the cutting disc and is held positioned for operation upon by the cutting disc through the medium of a bolt 61 that has a portion of its shank squared and passed through a square opening in the cutting disc 60 and through a rounded opening in the toothed disc 58, the bolt 61 being screwed in the socket end of either the shaft 7 or 8.

In Figure 15 I have shown an attachment in the nature of a sharpener for knives or scissors but which may also be employed as a buffer. The body of this attachment is round in plan and is, of course, of some suitable material best suited for its purpose. The body 62 has passed therethrough a bolt 63 which is screwed in the socket of a shaft 7. The body may be either formed with a continuous V-shaped groove adjacent to its outer end or the said outer end may be rounded to contact with the similar end of a disc 64. The V-shaped groove provided between the parts 62 and 64 afford therebetween a passage for the edge of a knife or scissors, to be sharpened while the rotating body 62 as well as its end 64 also serve for sharpening knives, scissors or the like or for buffing or polishing such instruments.

In Figure 16 I have illustrated a cylindrical wire brush 65 provided with a threaded stem or shaft 66 to be screwed in the socket end of the shaft 7. The brush is in the nature of a scratching or scraping element to remove substances from pans or the like which may be thereafter treated by a polishing head or buffer 67 disclosed by Figure 17 of the drawings. The buffer has an outer nose end 68 and its second end is provided with a threaded stub shaft 69 to be screwed in the socket end of the shaft 7 or 8. Of course, the brush 65 is removed before the buffer is attached to the shaft.

In Figures 18 and 19 I have disclosed a double edged cutter which is in the nature of a slicer attachment. The device includes an inner disc 69 having a threaded stub shaft 70 to be screwed in the socket of the shaft 7 and having secured on its outer face but spaced therefrom, by an element 71, a double edge blade 72. The blade has both of its ends pointed and from its said ends the said blade is gradually widened to the center thereof as clearly disclosed by Figure 8. The disc 16 serves as a guard for the blade and likewise as a stop for articles that are sliced or cut by the blade and preferably the disc is held from turning.

When the gear 20 is moved to a position between the pinions 23 and 24 no motion will be imparted to the shafts 8 and 7 should the said gear 20 be hitched to the motor 22 so that the motor can continue to operate without turning the shafts 8 or 7. The device is admirably adapted for use in hotel or other large kitchens and will likewise prove a valuable accessory in the kitchen of a housewife. Numerous implements besides those disclosed by the drawings may be easily attached to and readily operated by the machine and it is believed that the construction and advantages of the machine will be understood and appreciated by those skilled in the art so that further detailed description will not be required.

The feed roller 13 may be plain but preferably is fluted longitudinally, ribbed or serrated in order that the foodstuff contacting therewith will be positively fed onto the slicing, cutting or perforating elements carried by the shaft 7.

When the machine is used for tendering steak, the steak is passed edgewise through the space between the roller and the peripheries of the series of disks and inasmuch as the roller and the disks rotate at different rates of speed, the disks will cut slits in the side of the steak. After the steak has been run between the roller and the disks the first time, it may be turned at a right angle and run between the roller and the disks the second time so that crisscross slits are provided in the surface of the steak and the steak is reduced to a film having an uncut portion which connects the cubes together. Thus the steak retains its original size and shape and will be tender.

Having described the invention, we claim:

In a combination kitchen machine, a box-like body having a depending end provided with inwardly directed flanges to receive therebetween the ledge of a table or the like, binding elements on the lower flange, a removable top having its upper portion provided with an opening fixed on the body, a pair of spaced shafts journaled longitudinally between the body and top, a feed roller on one of the shafts, removable feed treating implements on the second shaft, a pair of spaced gears on the last named shaft, an idler toothed wheel meshing with the outer gear having a pinion on its inner face, a toothed wheel on the first-named shaft normally in mesh with the inner gear on the second named shaft, a handle for the last named toothed wheel susceptible to movement on the first named shaft for bringing the toothed wheel thereof into mesh with the pinion carried by the idler wheel, said shafts having their second ends provided with sockets and said body, between one of said shafts having outstanding ears, means for removably connecting implements to the socket end of either of the shafts and said ears providing supports for housings or casings for such implements which are removably secured to the ears.

In testimony whereof we affix our signatures.

AMERS W. ANDERSON.
EMIL O. STEBER.